July 31, 1951  C. L. MADDEN  2,562,501

CUSHIONING AND SHOCK ABSORBING DEVICE

Filed Nov. 21, 1946  3 Sheets-Sheet 1

Inventor:
Charles L. Madden.
By H. F. Woodward
Attorney.

July 31, 1951        C. L. MADDEN        2,562,501
CUSHIONING AND SHOCK ABSORBING DEVICE
Filed Nov. 21, 1946        3 Sheets-Sheet 2
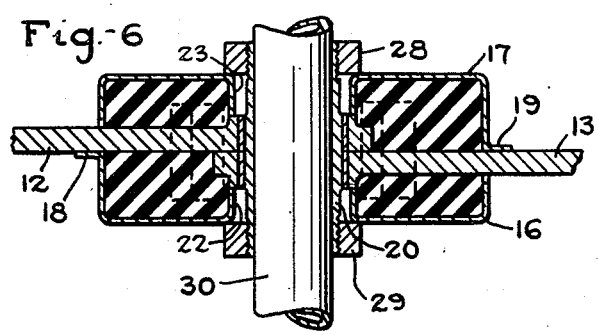
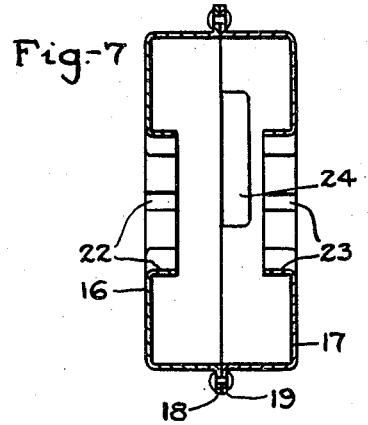
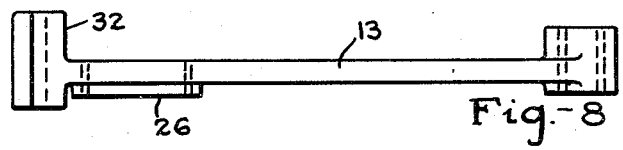
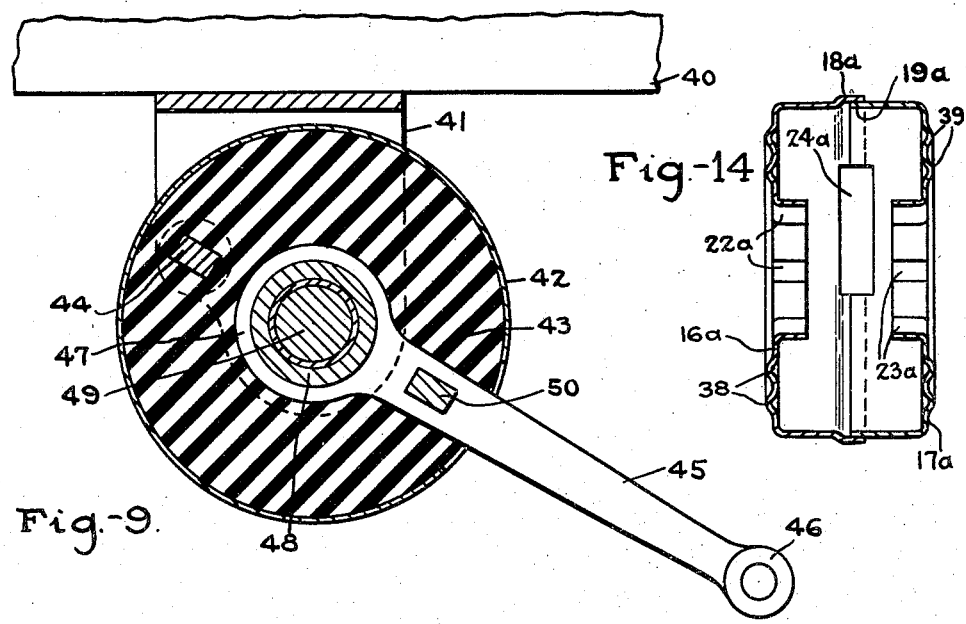
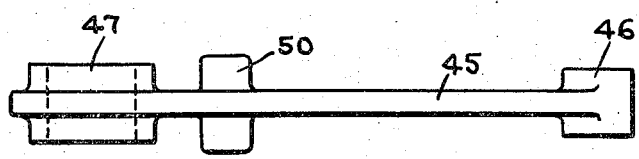
Inventor:
Charles L. Madden
By H. F. Woodward
Attorney.

July 31, 1951 — C. L. MADDEN — 2,562,501
CUSHIONING AND SHOCK ABSORBING DEVICE
Filed Nov. 21, 1946 — 3 Sheets-Sheet 3
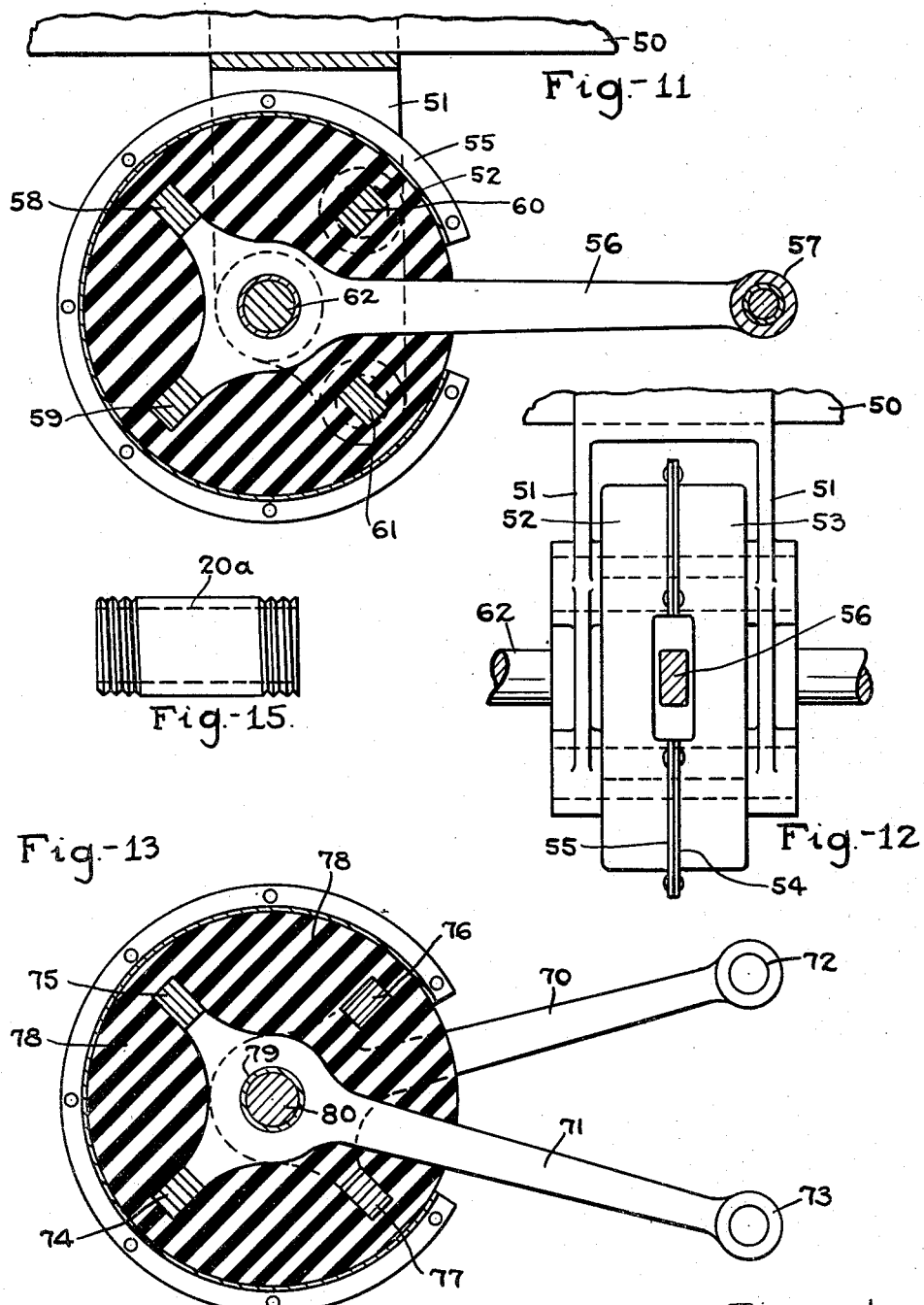
Inventor:
Charles L. Madden.
H. F. Woodward
Attorney.

Patented July 31, 1951

2,562,501

UNITED STATES PATENT OFFICE 2,562,501

CUSHIONING AND SHOCK ABSORBING DEVICE

Charles L. Madden, Minneapolis, Minn.

Application November 21, 1946, Serial No. 711,322

7 Claims. (Cl. 267—21)

This invention relates to a cushioning and shock absorbing device and more particularly to resilient means constituting a connection between a supporting means and a supported structure, one of which is subjected to vibrations and/or shock.

The device comprises a pair of resilient members and each of the resilient members being associated with means for transmitting shocks or vibrations thereto from a vibrated member whereby the resilient members absorb the vibrations through compression and tension thereof thus preventing the vibrations being transferred to the supported structure.

The shock or vibration absorbing devices of the prior art do not efficiently absorb the vibrations from a vibrated member so that vibrations are transmitted to the supported structure. Further, the prior devices do not withstand the strains to which they are subjected and therefore must be repaired or replaced by new devices quite often.

The primary object of the invention is to provide a resilient support which will efficiently absorb vibrations and which is of such construction that it is capable of being durable in operation.

The invention has for a further object to provide a device of the character mentioned which is simple in construction, reliable in operation, and easily installed.

Another object of the invention relates to the use of cushioning and shock absorbing device such as wheel suspension means for vehicles so that the wheels are resiliently mounted with respect to the frame of the vehicle.

Other and further objects and certain advantages of the invention will become apparent from the detailed description of the device.

It is found in the construction of motor vehicles according to the prior art that if there is any metal to metal contact, for example, between the engine and the chassis or frame, vibrations set up by the engine will be transmitted to the frame. The yielding action of the engine supports must be limited and the engine must be secured to the frame against any movement which would affect the alignment thereof.

Figure 6 is a sectional view of the shock absorbing device of Figure 1; and discloses the shaft which supports a vehicle wheel;

Figure 7 discloses a sectional view of the casing or housing which houses the resilient elements of the shock absorbing device;

Figure 8 is a plan view of one of the arms of the shock absorbing device;

Figure 9 is a sectional view of a modified form of shock absorbing device;

Figure 10 is an elevational view of an arm member for co-acting with the shock absorbing device disclosed in Figure 9;

Figure 11 is a sectional view of another modified form of a shock absorbing device;

Figure 12 is a side elevational view of the shock absorbing device disclosed in Figure 11;

Figure 13 is a sectional view of a third modified form of the shock absorbing device;

Figure 14 is a sectional view of a modified form of the casing or housing which holds the resilient elements of the shock absorbing device;

Figure 15 is an elevational view of a modified form of tubing member of the shock absorbing device.

Figure 1:
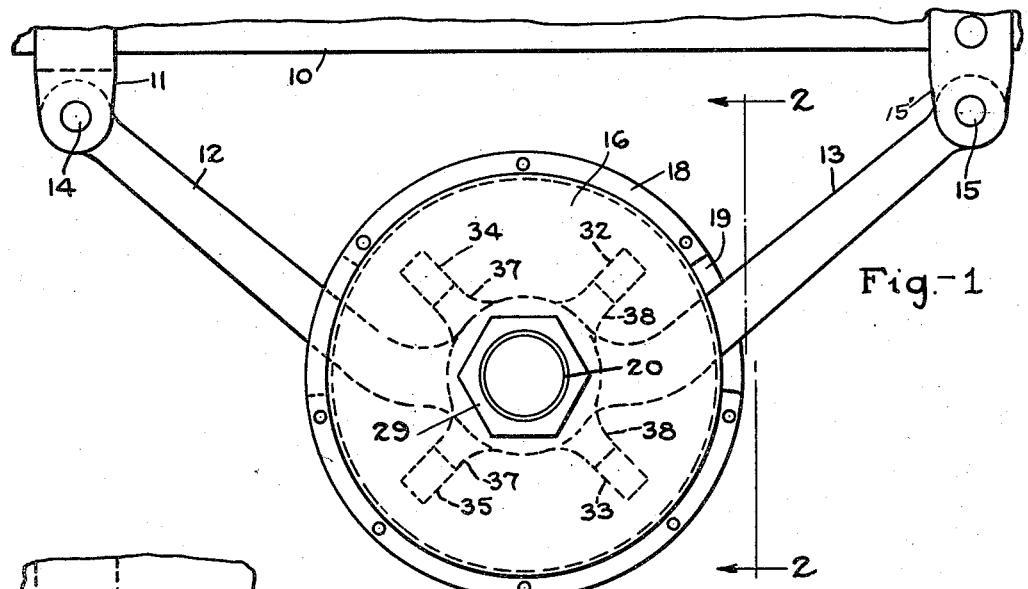
Figure 1 is a view in elevation showing the device secured to a supported member.
Figure 3:
Figure 3 is a sectional view of the shock absorbing device shown in Figure 1, associated with one of the supporting arms.
Figure 2:
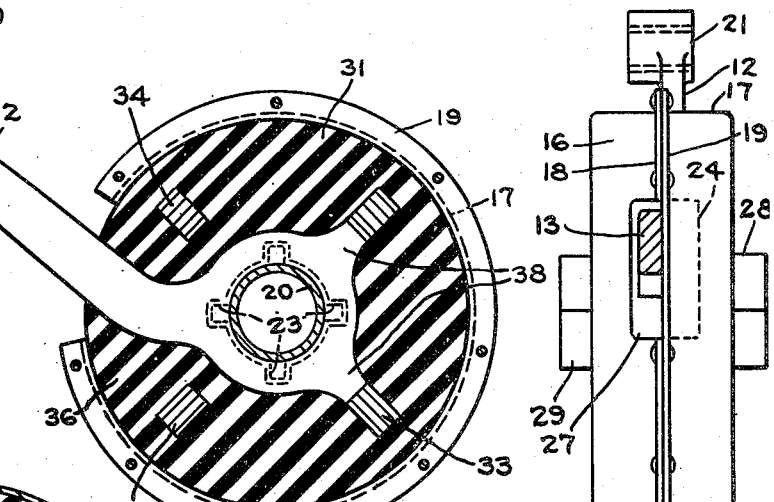
Figure 2 is a view taken along line 2—2 of Figure 1.
Figure 4:
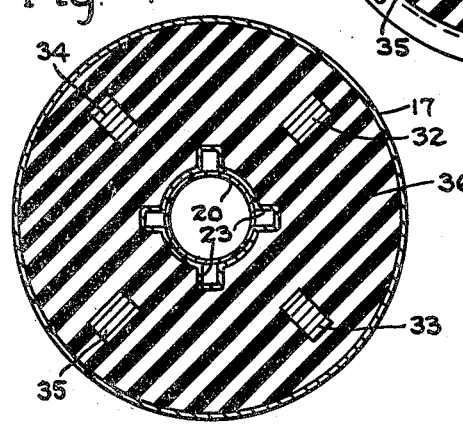
Figure 4 is a sectional view of the device shown in Figure 1.
Figure 5:
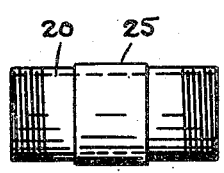
Figure 5 is an elevational view of tubing member of the shock absorbing device of Figure 1.

Referring in detail to the drawing, Figure 1 discloses a shock absorbing device which comprises a pair of resilient or rubber bodies; one of the rubber bodies is mounted in casing 16. The casing 16 is provided with inturned serrations or teeth-like portions 22 which are centrally disposed. The rubber is so formed that it fits into casing 16 and around serrations 22 whereby each rubber body is prevented from rotating in the casing. Likewise, the casing 17 also contains a body of rubber which is formed in like manner and fits about the serrations 23 of the casing 17 for preventing rotation of the rubber body therein.

A rod 12 is secured by a pin 14 to linkage-like ear 11 extending from frame 10 of a vehicle. A rod 13 is secured by a pin 15 to a plate 15' which is pivotally secured to the frame 10 of the vehicle. Arm 12 extends through an aperture in casing 17 and has a collar mounted on a raised portion 25 of a steel tube 20. The rod 12 is provided with arm 38 having angular portions or paddles 32 and 33 respectively, which are receivable in recesses formed in the rubber or resilient members in the casing 16 and 17. The rod 13 is also mounted by means of a collar on a portion of the raised portion 25 of the tube 20. The rod 13 comprises arms 37 which have angular extensions or paddles 34 and 35 receivable in recesses formed in the rubber body mounted in the casing 16 and 17.

Each casing 16 and 17 is provided with a central opening. Casing 17 is provided with a flange portion 19 while casing 16 is provided with a flange portion 18. After the rubber bodies have been formed they are positioned in the casings 16 and 17 respectively, and the rods 12 and 13 are mounted by their collars upon the tube 20 with the paddles 32, 33 and 34, 35, respectively inserted in the apertures in the rubber bodies, the flange 18 of casing 16 and flange 19 of casing 17 are fastened together by rivet or other appropriate means, thus forming a protective housing for the rubber bodies. The tube 20 is mounted upon a shaft 30 which carries a wheel upon one end (not shown). The tube 20 is provided with external screw threads on its opposite ends for receiving threaded nuts 28 and 29 respectively.

When the wheel of the vehicle (not shown) mounted upon the shaft 30 receives a shock or vibration, it is transmitted to the collar portions of the rods 12 and 13, and the vibration is then transmitted through the arms 38 and 37 to the paddles 32, 33, paddles 34 and 35 thereof, and the rubber bodies in the casings 16 and 17 are oscillated back and forth; and portions of the rubber bodies are alternately compressed and tensioned; and this compression and tension of the rubber bodies by the paddles on the rods 12 and 13 dampens the vibrations transmitted from the wheel of the vehicle and substantially no vibration is transmitted through rods 12 and 13 to the frame 10 of the vehicle.

The modified form of shock absorbing device of Figure 9 is very similar to the form of shock absorbing device of Figure 1 of the drawings. The housing for the rubber cushions 43 comprises two casing portions 42 which are secured together at their inner sides by flanges (not shown) for forming a housing for the rubber cushions. The casings 42 are provided with a central opening for receiving a tubing 48. A rod 45 is mounted by a collar 47 upon the tube member 48, and the rod 45 has projection 50 on its opposite sides, receivable in a recess in each of the rubber cushions forming an element of the shock absorbing device of this modification. Each casing portion 42 of the housing carries a projection 44 which extends into a hole in each of the rubber cushions.

One end of the rod 45 is secured by a bearing element 46 to a vehicle wheel, while the housing for the shock absorber is secured by a support 41 to a portion of the frame 40 of the vehicle.

When vibrations are transmitted to the projections 50 on the rod 45 from a vehicle wheel, portions of the rubber bodies are alternately compressed and sheared or tensioned, and as a result the vibrations are dampened and substantially no shocks are transmitted to the vehicle frame 40.

In the modified form of shock absorber set forth in Figure 11 of the drawings, casing portions 52 and 53 both contain rubber elements which are positioned therein. The casing portions 52 and 53 have flanges 55 and 54 by which they are secured together by appropriate means for providing a housing for the rubber cushions. The casing portions 52 and 53 have a central opening for receiving a tube and the tubing may be mounted upon a shaft 62. A rod 56 is carried upon the tube. The rod 56 has a pair of arm paddles 58 and 59 which extend into recesses of the rubber cushions in the casings 52 and 53.

Each casing 52 and 53 has projections 60 and 61 extending to apertures in the rubber cushions. The rod 56 extends through an opening in the casing portions 52 and 53. The rod 56 is secured by bearing 57 to a portion of a vehicle shaft or the like. Support 51 secured the housing for the shock absorber of this modification to the frame 50 of a vehicle.

The arrangement of the paddles 58 and 59 in the rubber cushions along with the stationary projection 60 and 61 co-act with the rubber cushions to dampen the vibrations transmitted thereto from a vehicle wheel so that no vibrations reach the vehicle frame 50.

In the modification of a shock absorber disclosed in Figure 13, a housing for the two rubber bodies 78 comprises two casings which may be secured together by flanges on the casings as shown in Figure 12 or as shown in Figure 14. A central opening in the casings has a tubing 79 receivable therein. The bearing 73 is secured to a shaft and may support a wheel of a vehicle such as an automobile or the like, while bearing 73 would be connected for example to the vehicle frame.

Rods 70 and 71 are each provided with collars for mounting them upon the tubing 79. The rods 70 and 71 have a pair of arms carrying extensions or paddles 76 and 77 and 74 and 75 respectively, extending into recesses in the two rubber bodies 78. The rods 70 and 71 extend into scissor arrangement out of an aperture in the housing for the rubber cushions. The shock absorber of this modification efficiently absorbs vibrations from a road wheel, an engine, gum mounts or other devices where the paddles 76 and 77 on the rod 70 and paddles 74 and 75 on rod 71 compress and tension the rubber cushions carried in the housing.

In each of the forms of the shock absorber, there is a pair of rubber cushions which have portions thereof alternately compressed and sheared or tensioned, and this action of the rubber cushions insures that substantially all vibrations transmitted to the shock absorber are dampened and dissipated so that substantially no vibrations are transmitted to the frame of a vehicle. The pair of rubber cushions equally receive the vibrations and dissipate them and this arrangement results in an efficient operation and long life to the shock absorber.

The shock absorbing device of the various modifications may be and preferably is housed in a casing similar to that shown in Figure 14. The housing of the form shown in Figure 14 includes a casing 16a and 17a. The casing 16a is provided with portion or flange 18a under which edge 19a of casing 17a is adapted to slide. The casings 16a and 17a are provided with bead-like member or grooves 39 and 38 respectively, into which the rubber or similar material flows when under compression during dampening and dispersing vibrations and shock and when the rubber is pre-compressed.

The tube member 20a may be used with casings of the type shown in Figure 14. This permits the adjusting of the compression applied to the yieldable members positioned in the casings. The rubber or similar member in the casing may be placed under compression when the casings are assembled if pre-compression is desired. Also, it permits adjusting of the pressure by merely tightening one or both nuts secured on the threaded ends of tube 20a.

It is to be understood that the method of securing the device to the supporting structure and supported structure may be varied to meet the needs of each installation.

What I claim as new is:

1. In a cushioning and absorbing device comprising a housing, a member extending through the housing, two resilient members mounted in abutting relationship, arms extending into the housing between the resilient members and mounted on the member extending through the housing, means on the housing to prevent rotation of the resilient members therein, paddle-like members extending from the arms and into both of the resilient members.

2. In a device of the class described, a housing comprising two sections and having a centrally disposed opening in said housing, serrations on the housing and extending into the housing and positioned around the centrally disposed opening, a pair of rubber members mounted in the housing and prevented from rotation therein by said serrations, a member extending through the opening in the housing, arm members mounted on the member extending through the housing, said arms extending from the housing, and paddle-like members extending from the arm within the housing and into the pair of rubber members.

3. In a device of the class described comprising a drum-like housing, the said housing consisting of two sections with a substantially centrally located opening, a pair of resilient members mounted in the housing, means positioned around the centrally located opening to prevent rotation of the resilient members positioned in the housing, arms extending into the housing between the resilient members, a member extending through the centrally disposed opening in the housing, said arms mounted on said member extending through the housing and adapted to move thereon when dampening vibrations transmitted through the arms.

4. In a cushioning device, a pair of cushioning elements of yieldable material mounted in a housing, means on said housing for anchoring said yieldable cushioning elements against rotation in respect to said housing said anchoring means including serrations and at least one inwardly projecting member, a member extending through the said housing, and an arm having one end mounted on said member extending through said housing and positioned between the yieldable material, and projections extending from said arm into the pair of elements of yieldable material.

5. In a cushioning device connected between a supported member and supporting member, a cushioning means comprising a pair of disc-like elements of yieldable material mounted in abutting relationship in a housing, said housing comprising two sections, means for securing the housing in assembled position, means on the housing for anchoring the disc-like elements of yieldable material against rotation within said housing, a member extending through said housing and the yieldable elements, a pair of arms having one end of each arm mounted on said member and the arms extending outwardly between the pair of disc-like elements of yieldable material, each arm having means extending therefrom and into the yieldable material, one end of the first arm connected to a supported member and the end of the second arm connected to a supporting member.

6. In a cushioning device of the class described, a housing for a substantially centrally disposed opening, cushioning means comprising a pair of elements of yieldable material and mounted in abutting relationship in the housing, means on the housing for anchoring said elements of yieldable material against rotation with respect to said housing, a member extending through the centrally disposed opening and having a raised portion thereon, a pair of arms mounted on said raised portion and adapted to move thereon, one of said arms having a series of projections extending into each of the elements of yieldable material, the other arm having a series of projections thereon and extending into each of the yieldable material, one end of the first arm being connected to a supporting member and one end of the other arm connected to a supported member.

7. A cushioning and absorbing device comprising a drum-shaped housing having a substantially centrally located opening therein, means extending into the housing and located about the centrally located opening for preventing rotation of yieldable elements mounted in said housing, a pair of elements of resilient material mounted in said housing, a member extending through the housing and the resilient elements, a pair of arms extending into said housing between said yieldable elements, said arms mounted on the member extending through said centrally located opening, and paddle-like members on the arms and extending into the resilient elements.

CHARLES L. MADDEN.

REFERENCES CITED

The following references are of record in the file of this patent:

UNITED STATES PATENTS

| Number | Name | Date |
|---|---|---|
| 808,251 | Von Nolle | Dec. 26, 1905 |
| 1,692,965 | Tibbetts | Nov. 27, 1928 |
| 1,753,985 | Flintermann | Apr. 8, 1930 |
| 1,780,727 | Tenney | Nov. 4, 1930 |
| 1,983,259 | Weiland | Dec. 4, 1934 |
| 2,028,991 | Pernice | Jan. 28, 1936 |
| 2,069,049 | Saurer | Jan. 26, 1937 |

FOREIGN PATENTS

| Number | Country | Date |
|---|---|---|
| 701,969 | France | Jan. 19, 1931 |
| 595,489 | Germany | Apr. 12, 1934 |
| 825,496 | France | Dec. 8, 1937 |